United States Patent
Narita et al.

(10) Patent No.: US 10,789,976 B2
(45) Date of Patent: Sep. 29, 2020

(54) MAGNETIC HEAD INCLUDING FIRST AND SECOND STACKED BODIES AND CURRENT FLOW ARRANGEMENTS AND MAGNETIC RECORDING AND REPRODUCING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Naoyuki Narita, Chiba (JP); Tomoyuki Maeda, Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/351,028

(22) Filed: Mar. 12, 2019

(65) Prior Publication Data
US 2020/0075047 A1 Mar. 5, 2020

(30) Foreign Application Priority Data
Sep. 4, 2018 (JP) .................. 2018-165501

(51) Int. Cl.
*G11B 5/31* (2006.01)
*G11B 5/235* (2006.01)
(Continued)

(52) U.S. Cl.
CPC .......... *G11B 5/3146* (2013.01); *G11B 5/1278* (2013.01); *G11B 5/235* (2013.01); *G11B 5/315* (2013.01); *G11B 2005/0024* (2013.01)

(58) Field of Classification Search
None
See application file for complete search history.

(56) References Cited

U.S. PATENT DOCUMENTS 8,254,059 B2  8/2012  Horide et al.
9,076,463 B2  7/2015  Yamada et al.
(Continued)

FOREIGN PATENT DOCUMENTS

JP  2012-123894 A  6/2012
JP  2015-210835 A  11/2015

OTHER PUBLICATIONS

Zhu et al., "Microwave Assisted Magnetic Recording Utilizing Perpendicular Spin Torque Oscillator With Switchable Perpendicular Electrodes," IEEE Trans. on Magnetics, 'Col. 46, No. 3, pp. 751-757 (2010), Mar. 2010.

*Primary Examiner* — Craig A. Renner
(74) *Attorney, Agent, or Firm* — Finnegan, Henderson, Farabow, Garrett & Dunner, L.L.P.

(57) ABSTRACT

According to one embodiment, a magnetic head includes a magnetic pole, a first shield, a second shield, a first stacked body and a second stacked body. At least a portion of the magnetic pole is provided between the first and second shields. The first stacked body is provided between the magnetic pole and the first shield. The second stacked body is provided between the magnetic pole and the second shield. The first stacked body includes a first magnetic layer including, a first conductive layer provided between the magnetic pole and the first magnetic layer, and a second conductive layer provided between the first magnetic layer and the first shield. The second stacked body includes a second magnetic layer including, a third conductive layer provided between the magnetic pole and the second magnetic layer, and a fourth conductive layer provided between the second magnetic layer and the second shield.

19 Claims, 9 Drawing Sheets

(51) Int. Cl.
    *G11B 5/127*    (2006.01)
    *G11B 5/00*    (2006.01)

(56) References Cited

U.S. PATENT DOCUMENTS

| | | |
|---|---|---|
| 9,390,731 B2 | 7/2016 | Koui |
| 9,805,745 B1 * | 10/2017 | Takagishi et al. ...... G11B 5/315 |
| 10,325,618 B1 * | 6/2019 | Wu et al. ............. G11B 5/1278 |
| 2012/0075748 A1 * | 3/2012 | Kief et al. ........... G11B 5/1278 |
| | | 360/121 |
| 2012/0140356 A1 * | 6/2012 | Horide ................. G11B 5/1278 |
| | | 360/123.12 |
| 2015/0043106 A1 * | 2/2015 | Yamada et al. ...... G11B 5/1278 |
| | | 360/123.05 |
| 2019/0088275 A1 | 3/2019 | Narita et al. |
| 2019/0244634 A1 * | 8/2019 | Goncharov et al. ..... G11B 5/23 |

* cited by examiner

US 10,789,976 B2

MAGNETIC HEAD INCLUDING FIRST AND SECOND STACKED BODIES AND CURRENT FLOW ARRANGEMENTS AND MAGNETIC RECORDING AND REPRODUCING DEVICE

CROSS-REFERENCE TO RELATED APPLICATIONS

This application is based upon and claims the benefit of priority from Japanese Patent Application No. 2018-165501, filed on Sep. 4, 2018; the entire contents of which are incorporated herein by reference.

FIELD

Embodiments described herein relate generally to a magnetic head and a recording and reproducing device.

BACKGROUND

Information is recorded in a magnetic storage medium such as a HDD (Hard Disk Drive) or the like using a magnetic head. It is desirable to increase the recording density of the magnetic head and the magnetic recording and reproducing device.

DETAILED DESCRIPTION

Figure 1A:
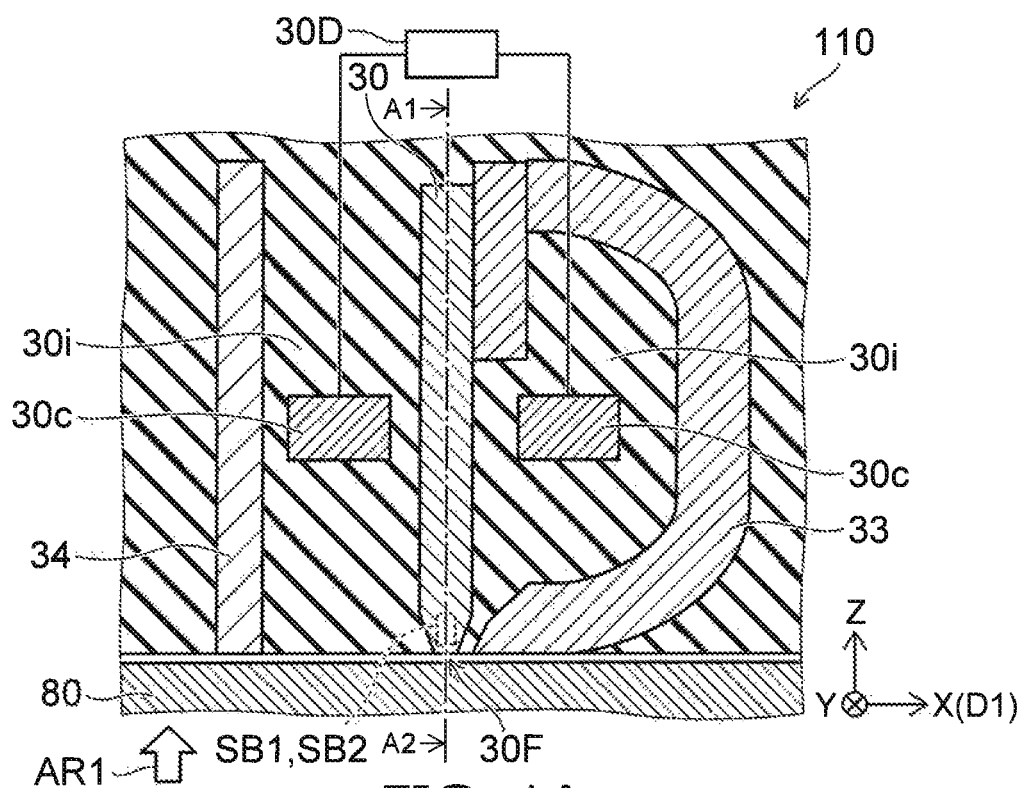
FIG. 1A and FIG. 1B are schematic views illustrating a magnetic head according to a first embodiment.

According to one embodiment, a magnetic head includes a magnetic pole, a first shield, a second shield, a first stacked body, and a second stacked body. At least a portion of the magnetic pole is provided between the first shield and the second shield. The first stacked body is provided between the magnetic pole and the first shield. The second stacked body is provided between the magnetic pole and the second shield. The first stacked body includes a first magnetic layer including at least one selected from the group consisting of Fe, Co, and Ni, a first conductive layer provided between the magnetic pole and the first magnetic layer, and a second conductive layer provided between the first magnetic layer and the first shield. The second stacked body includes a second magnetic layer including at least one selected from the group consisting of Fe, Co, and Ni, a third conductive layer provided between the magnetic pole and the second magnetic layer, and a fourth conductive layer provided between the second magnetic layer and the second shield.

According to another embodiment, a magnetic recording and reproducing device includes the magnetic head recited above, a magnetic recording medium, and a first electrical circuit.

Information is recorded in the magnetic recording medium by the magnetic head. The first electrical circuit is configured to supply a current to the first stacked body.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
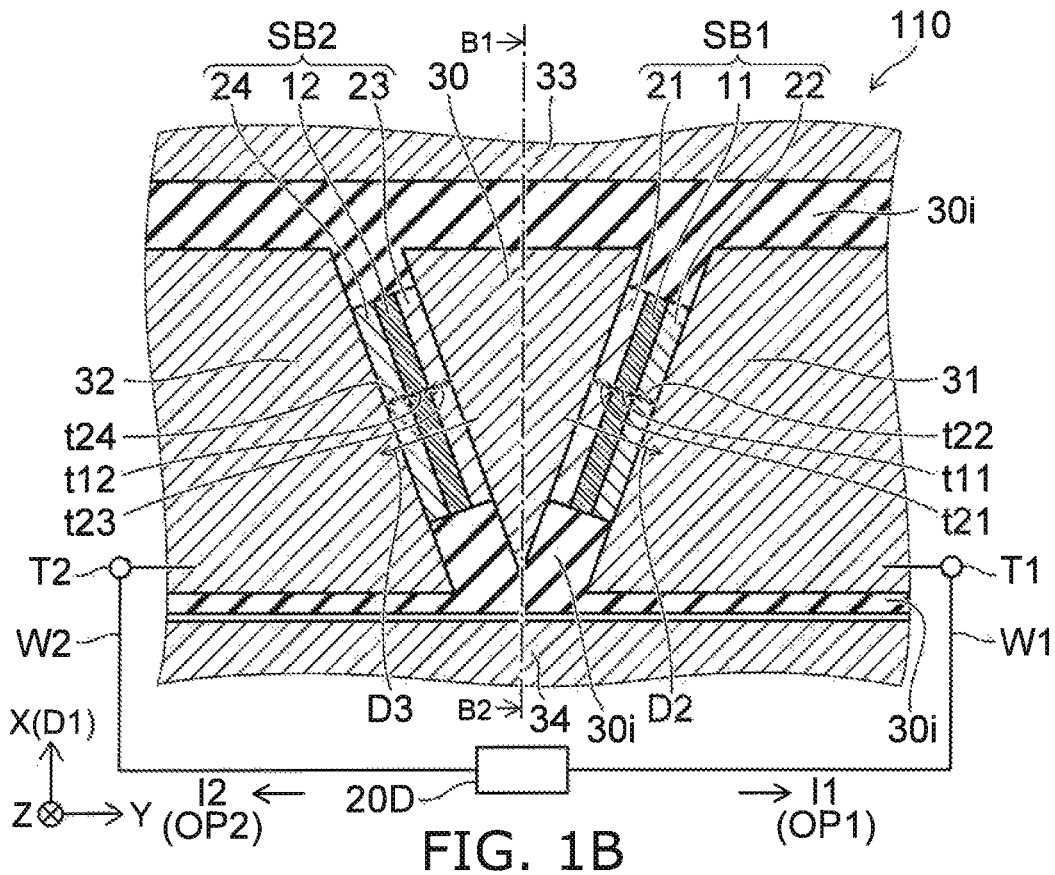
Figure 2:
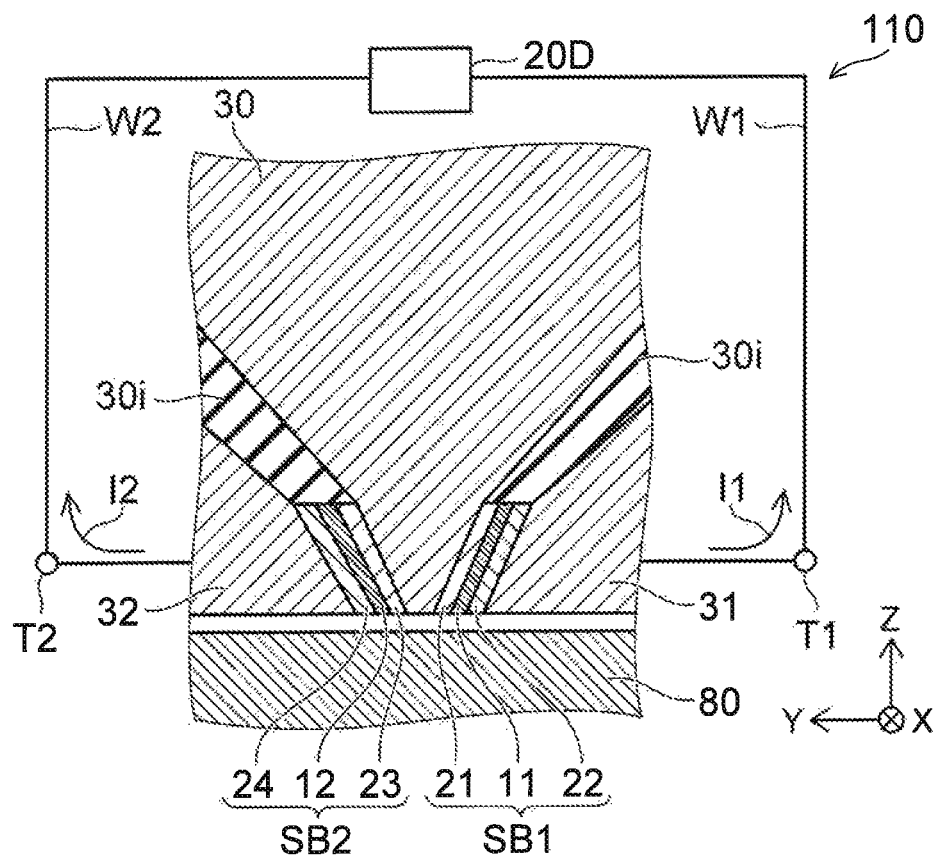
FIG. 2 is a schematic view illustrating the magnetic head according to the first embodiment.

FIG. 1A, FIG. 1B, and FIG. 2 are schematic views illustrating a magnetic head according to a first embodiment.

FIG. 1A is a line B1-B2 cross-sectional view of FIG. 1B. FIG. 1B is a plan view viewed along arrow AR1 of FIG. 1A. FIG. 2 is a line A1-A2 cross-sectional view of FIG. 1A.

As shown in FIG. 1B, the magnetic head 110 according to the embodiment includes a magnetic pole 30, a first shield 31, a second shield 32, a first stacked body SB1, and a second stacked body SB2. At least a portion of the magnetic pole 30 is provided between the first shield 31 and the second shield 32. The first stacked body SB1 is provided between the magnetic pole 30 and the first shield 31. The second stacked body SB2 is provided between the magnetic pole 30 and the second shield 32.

As shown in FIG. 1A, a coil 30c, a third shield 33, and a fourth shield 34 are further provided.

The direction from the magnetic pole 30 toward the third shield 33 is aligned with a first direction D1 (referring to FIG. 1A and FIG. 1B). The first direction D1 is taken as an X-axis direction. One direction perpendicular to the X-axis direction is taken as a Z-axis direction. A direction perpendicular to the X-axis direction and the Z-axis direction is taken as a Y-axis direction.

The magnetic pole 30 is, for example, a major magnetic pole. The magnetic pole 30 has a first surface 30F. The first surface 30F opposes a magnetic recording medium 80. For example, the first surface 30F corresponds to a medium-opposing surface. For example, the first surface 30F corresponds to an ABS (Air Bearing Surface).

A recording electrical circuit (a second electrical circuit 30D) is electrically connected to the coil 30c. A recording current is supplied from the recording electrical circuit to the coil 30c. A magnetic field (a recording magnetic field) that corresponds to the recording current is generated from the magnetic pole 30. The recording magnetic field is applied to the magnetic recording medium 80; and information is recorded in the magnetic recording medium 80. Thus, the recording electrical circuit (the second electrical circuit 30D) is configured to supply, to the coil 30c, a current (a recording current) corresponding to the information to be recorded.

For example, a direction perpendicular to the first surface 30F is taken as the Z-axis direction. The Z-axis direction is, for example, the height direction. The X-axis direction is, for example, the down-track direction. The Y-axis direction is, for example, the cross-track direction. The first direction D1 (the X-axis direction) is aligned with the direction of the relative movement between the magnetic pole 30 and the magnetic recording medium 80 opposed by the magnetic pole 30. The angle between the first direction D1 and the direction of the relative movement between the magnetic pole 30 and the magnetic recording medium 80 opposed by the magnetic pole 30 is ±25 degrees or less. This angle may be ±20 degrees or less. The absolute value of the angle between the first direction D1 and the down-track direction is less than the absolute value of the angle between the first direction D1 and the cross-track direction.

For example, the third shield 33 corresponds to a "trailing shield." For example, the fourth shield 34 corresponds to a "leading shield." The third shield 33 is, for example, an auxiliary magnetic pole. The third shield 33 can form a magnetic core with the magnetic pole 30. The fourth shield 34 is, for example, an auxiliary magnetic pole. The fourth shield 34 may form a magnetic core with the magnetic pole 30.

The direction (the first direction D1) from the magnetic pole 30 toward the third shield 33 crosses the direction (in the example, the Y-axis direction) from the first shield 31 toward the second shield 32.

For example, the first shield 31 corresponds to a first side shield. For example, the second shield 32 corresponds to a second side shield.

The first stacked body SB1 includes a first magnetic layer 11, a first conductive layer 21, and a second conductive layer 22. The first magnetic layer 11 includes at least one selected from the group consisting of Fe, Co, and Ni. The first magnetic layer 11 is, for example, an FeCo layer, an FeNi layer, etc. The first magnetic layer 11 is, for example, ferromagnetic. The first magnetic layer 11 includes, for example, a ferromagnetic metal.

The first conductive layer 21 is provided between the magnetic pole 30 and the first magnetic layer 11. The second conductive layer 22 is provided between the first magnetic layer 11 and the first shield 31. The first conductive layer 21 and the second conductive layer 22 are, for example, nonmagnetic. The first conductive layer 21 and the second conductive layer 22 include, for example, nonmagnetic metals. For example, the material of the first conductive layer 21 is different from the material of the second conductive layer 22.

In one example, the first conductive layer 21 contacts the magnetic pole 30 and the first magnetic layer 11. In one example, the second conductive layer 22 contacts the first magnetic layer 11 and the first shield 31.

The second stacked body SB2 includes a second magnetic layer 12, a third conductive layer 23, and a fourth conductive layer 24. The second magnetic layer 12 includes at least one selected from the group consisting of Fe, Co, and Ni. The second magnetic layer 12 is, for example, an FeCo layer, an FeNi layer, etc. The second magnetic layer 12 is, for example, ferromagnetic. The second magnetic layer 12 includes, for example, a ferromagnetic metal.

The third conductive layer 23 is provided between the magnetic pole 30 and the second magnetic layer 12. The fourth conductive layer 24 is provided between the second magnetic layer 12 and the second shield 32. The third conductive layer 23 and the fourth conductive layer 24 are, for example, nonmagnetic. The third conductive layer 23 and the fourth conductive layer 24 include, for example, nonmagnetic metals. For example, the material of the third conductive layer 23 is different from the material of the fourth conductive layer 24.

In one example, the third conductive layer 23 contacts the magnetic pole 30 and the second magnetic layer 12. In one example, the fourth conductive layer 24 contacts the second magnetic layer 12 and the second shield 32.

The magnetic pole 30 is electrically connected to the first shield 31 via the first stacked body SB1. The magnetic pole 30 is electrically connected to the second shield 32 via the second stacked body SB2.

In the example, an insulating portion 30i electrically insulates between the first shield 31 and the third shield 33, between the second shield 32 and the third shield 33, between the first shield 31 and the fourth shield 34, and between the second shield 32 and the fourth shield 34. In the embodiment, the third shield 33 may be electrically connected to one of the first shield 31 or the second shield 32. The fourth shield 34 may be electrically connected to the other of the first shield 31 or the second shield 32.

For example, the thickness of the first magnetic layer 11 along the direction (e.g., a second direction D2) from the magnetic pole 30 toward the first shield 31 is taken as a thickness t11. The thickness t11 is, for example, not less than 4 nm and not more than 20 nm.

The thickness of the first conductive layer 21 along the direction (the second direction D2) from the magnetic pole 30 toward the first shield 31 is taken as a thickness t21. The thickness of the second conductive layer 22 along the second direction D2 is taken as a thickness t22. The thickness t21 and the thickness t22 each are not less than 0.3 nm and not more than 15 nm.

For example, the thickness of the second magnetic layer 12 along the direction from the magnetic pole 30 toward the second shield 32 is taken as a thickness t12. The thickness t12 is, for example, not less than 4 nm and not more than 20 nm.

The thickness of the third conductive layer 23 along the direction (a third direction D3) from the magnetic pole 30 toward the second shield 32 is taken as a thickness t23. The thickness of the fourth conductive layer 24 along the third direction D3 is taken as a thickness t24. The thickness t23 and the thickness t24 each are, for example, not less than 0.3 nm and not more than 15 nm.

As described below, for example, the magnetization of the first magnetic layer 11 and the magnetization of the second magnetic layer 12 are set to the desired orientations easily by using such thicknesses.

A first terminal T1 and a second terminal T2 are provided as shown in FIG. 1B and FIG. 2. The first terminal T1 is electrically connected to the first shield 31. The second terminal T2 is electrically connected to the second shield 32.

For example, a first interconnect W1 and a second interconnect W2 may be provided. The first interconnect W1 is electrically connected to the first terminal T1. The second interconnect W2 is electrically connected to the second terminal T2.

For example, the first interconnect W1 and the second interconnect W2 are electrically connected to a first electrical circuit 20D. The first electrical circuit 20D is configured to supply a current (a first current I1 or a second current I2) to the first stacked body SB1 and the second stacked body SB2.

A first operation OP1 may be performed for the magnetic head 110. In the first operation OP1, a current (the first current I1) that has an orientation from the first terminal T1 toward the second terminal T2 flows in a path including the first stacked body SB1, the magnetic pole 30, and the second stacked body SB2. In the first operation OP1, the potential of the first terminal T1 is higher than the potential of the second terminal T2.

A second operation OP2 may be performed for the magnetic head 110. In the second operation OP2, a current (the second current I2) that has an orientation from the second terminal T2 toward the first terminal T1 flows in a path including the second stacked body SB2, the magnetic pole 30, and the first stacked body SB1. In the second operation OP2, the potential of the second terminal T2 is higher than the potential of the first terminal T1. The orientation of the magnetization of the magnetic layer (at least one of the first magnetic layer 11 or the second magnetic layer 12) included in such a stacked body (at least one of the first stacked body SB1 or the second stacked body SB2) can be controlled by a current flowing in the stacked body. For example, the magnetization of the magnetic layer changes to have a component having the reverse orientation of the orientation of the magnetic field emitted from the magnetic pole 30. The distribution of the orientation of the magnetic field emitted from the magnetic pole 30 can be controlled appropriately thereby. Operations of one example will now be described. In the example, the first conductive layer 21 includes Ir; and the second conductive layer 22 includes Cu. The third conductive layer 23 includes Ir; and the fourth conductive layer 24 includes Cu.

Figure 3A:
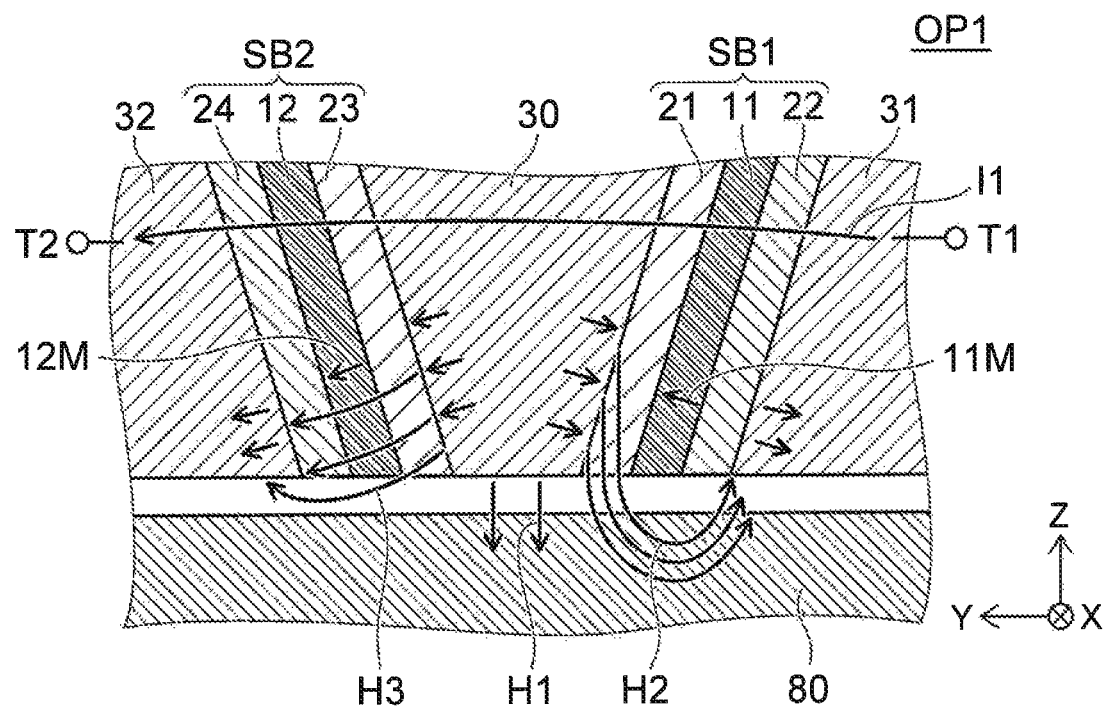
FIG. 3A and FIG. 3B are schematic views illustrating the operations of the magnetic head according to the first embodiment.
Figure 3B:
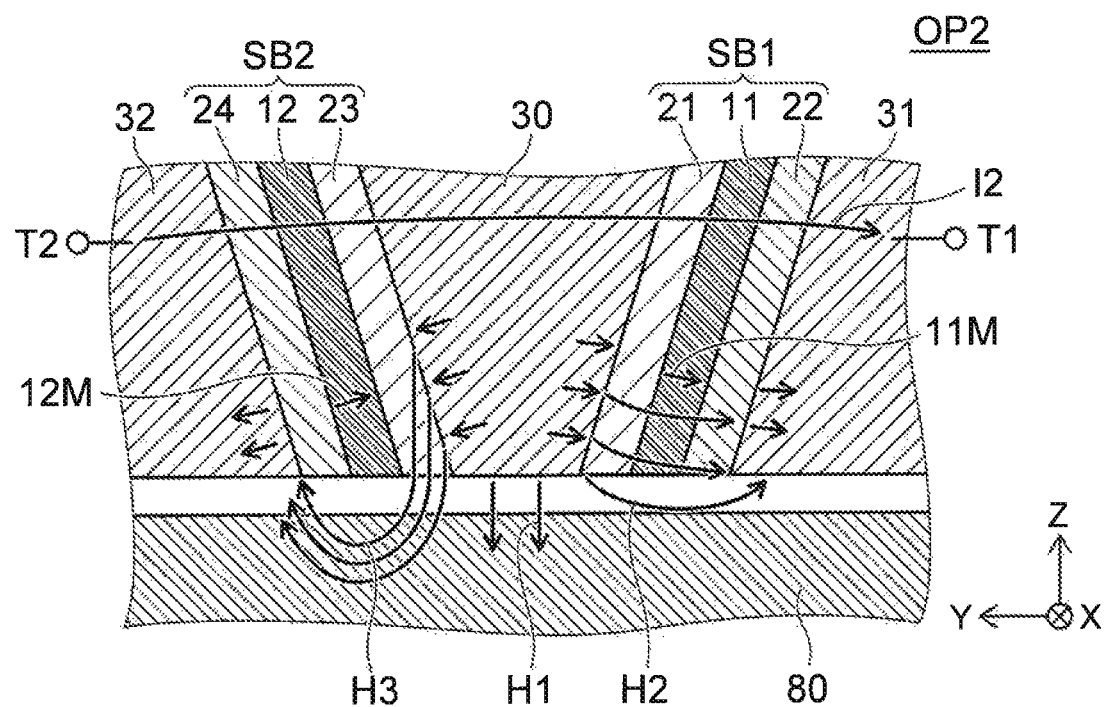

FIG. 3A and FIG. 3B are schematic views illustrating the operations of the magnetic head according to the first embodiment.

FIG. 3A corresponds to the first operation OP1. FIG. 3B corresponds to the second operation OP2.

In the first operation OP1 as shown in FIG. 3A, the first current I1 flows through the first shield 31, the second conductive layer 22, the first magnetic layer 11, the first conductive layer 21, the magnetic pole 30, the third conductive layer 23, the second magnetic layer 12, the fourth conductive layer 24, and the second shield 32 in this order.

A magnetic field is generated from the magnetic pole 30 by causing the recording current to flow in the coil 30c. A portion (a magnetic field H1) of the magnetic field emitted from the magnetic pole 30 is oriented toward the magnetic recording medium 80. On the other hand, another portion of the magnetic field emitted from the magnetic pole 30 has a component toward the first shield 31 or a component toward the second shield 32.

When the first current I1 flows in the first stacked body SB1, a magnetization 11M of the first magnetic layer 11 has a component having the reverse orientation of another portion (a magnetic field H2) of the magnetic field emitted from the magnetic pole 30. This is due to, for example, the effect of spin-transfer torque. Thereby, it is difficult for the magnetic field H2 to pass through the first magnetic layer 11. As a result, the magnetic field H2 is oriented easily toward the magnetic recording medium 80. Thereby, the strength of the recording magnetic field can be changed steeply at the end portion in the cross-track direction (the end portion on the first shield 31 side). The strength of the magnetic field at the end can be stronger.

On the other hand, another portion (a magnetic field H3) of the magnetic field emitted from the magnetic pole 30 has a component toward the second shield 32. When the first current I1 flows in the second stacked body SB2, a magnetization 12M of the second magnetic layer 12 has a component in the same orientation as the magnetic field H3. Thereby, the magnetic field H3 passes through the second magnetic layer 12. Thereby, the strength of the recording magnetic field does not change steeply at the end portion in the cross-track direction (the end portion on the second shield 32 side).

In the embodiment, the distribution of the magnetic field in the cross-track direction can be asymmetric. For example, compared to a symmetric distribution of the magnetic field, the strength can be stronger at one end for an asymmetric distribution of the magnetic field.

For example, there are cases where shingle recording is performed. In shingle recording, a first track is recorded; and a second track is recorded by being overlaid on a portion of the first track. Shingle recording can be performed better by strengthening the magnetic field at one end of the second track.

In the embodiment, for example, the distribution of the recording magnetic field in the cross-track direction can be controlled. Thereby, for example, good recording and reproducing characteristics are obtained even when the spacing in the cross-track direction of multiple tracks is reduced.

According to the embodiment, a magnetic head and a magnetic recording and reproducing device can be provided in which the recording density can be increased.

In the second operation OP2 as shown in FIG. 3B, the second current I2 flows through the second shield 32, the fourth conductive layer 24, the second magnetic layer 12, the third conductive layer 23, the magnetic pole 30, the first conductive layer 21, the first magnetic layer 11, the second conductive layer 22, and the first shield 31 in this order.

In such a case as well, a magnetic field is generated from the magnetic pole 30 by causing the recording current to flow in the coil 30c. A portion (the magnetic field H1) of the magnetic field emitted from the magnetic pole 30 is oriented toward the magnetic recording medium 80. Another portion of the magnetic field emitted from the magnetic pole 30 has a component toward the first shield 31 or a component toward the second shield 32.

When the second current I2 flows in the second stacked body SB2, the magnetization 12M of the second magnetic layer 12 has a component having the reverse orientation of another portion (the magnetic field H3) of the magnetic field emitted from the magnetic pole 30. This is due to, for example, the effect of spin-transfer torque. Thereby, it is difficult for the magnetic field H3 to pass through the second magnetic layer 12. As a result, the magnetic field H3 is oriented easily toward the magnetic recording medium 80. Thereby, the strength of the recording magnetic field can be changed steeply at the end portion in the cross-track direction (the end portion on the second shield 32 side). The strength of the magnetic field at the end can be stronger.

On the other hand, the magnetic field H2 that is emitted from the magnetic pole 30 has a component toward the first shield 31. When the second current I2 flows in the first stacked body SB1, the magnetization 11M of the first magnetic layer 11 has a component in the same orientation as the magnetic field H2. Thereby, the magnetic field H2 passes through the first magnetic layer 11. Thereby, the strength of the recording magnetic field does not change steeply at the end portion in the cross-track direction (the end portion on the first shield 31 side).

In the second operation OP2 as well, the distribution of the magnetic field in the cross-track direction can be asymmetric.

For example, compared to a symmetric distribution of the magnetic field, the strength can be stronger at one end for an asymmetric distribution of the magnetic field.

In shingle recording, there are cases where the positions of the end portions where the overlapping recording is performed change between an inner circumferential region and an outer circumferential region. In such a case, one of the first operation OP1 or the second operation OP2 may be performed in the inner circumferential region. Then, one of the first operation OP1 or the second operation OP2 may be performed in the outer circumferential region. The shingle recording can be performed better.

It is considered that the orientations of the magnetizations (the magnetization 11M and the magnetization 12M) of the first magnetic layer 11 and the second magnetic layer 12 are dependent on the orientation of the current and the characteristics of the materials of the conductive layers.

In a first configuration (one example), the first conductive layer 21 includes at least one selected from the group consisting of Ta, Pt, W, Ru, Mo, Ir, Rh, and Pd. In such a case, the second conductive layer 22 includes at least one selected from the group consisting of Cu, Ag, Al, and Au. In such a case, the third conductive layer 23 includes at least one selected from the group consisting of Ta, Pt, W, Ru, Mo, Ir, Rh, and Pd. In such a case, the fourth conductive layer 24 includes at least one selected from the group consisting of Cu, Ag, Al, and Au.

In the first configuration, the current may be conductible from the second conductive layer 22 toward the first conductive layer 21 and from the third conductive layer 23 toward the fourth conductive layer 24. For example, when the first current I1 that has the orientation from the first terminal T1 toward the second terminal T2 is supplied (the first operation OP1), the magnetization 11M of the first magnetic layer 11 has the reverse orientation of the magnetic field emitted from the magnetic pole 30. The magnetization 12M of the second magnetic layer 12 does not reverse.

In the first configuration, when the second current I2 that has the orientation from the second terminal T2 toward the first terminal T1 is supplied (the second operation OP2), the magnetization 12M of the second magnetic layer 12 has the reverse orientation of the magnetic field emitted from the magnetic pole 30. The magnetization 11M of the first magnetic layer 11 does not reverse.

In one example of a second configuration (one other example), the first conductive layer 21 includes at least one selected from the group consisting of Cu, Ag, Al, and Au. In such a case, the second conductive layer 22 includes at least one selected from the group consisting of Ta, Pt, W, Ru, Mo, Ir, Rh, and Pd. In such a case, the third conductive layer 23 includes at least one selected from the group consisting of Cu, Ag, Al, and Au. The fourth conductive layer 24 includes at least one selected from the group consisting of Ta, Pt, W, Ru, Mo, Ir, Rh, and Pd.

In the second configuration, a current may be conductible from the fourth conductive layer 24 toward the third conductive layer 23 and from the first conductive layer 21 toward the second conductive layer 22. For example, when the second current I2 that has the orientation from the second terminal T2 toward the first terminal T1 is supplied (the second operation OP2), the magnetization 11M of the first magnetic layer 11 has the reverse orientation of the magnetic field emitted from the magnetic pole 30. The magnetization 12M of the second magnetic layer 12 does not reverse.

In the second configuration, when the first current I1 that has the orientation from the first terminal T1 toward the second terminal T2 is supplied (the first operation OP1), the magnetization 12M of the second magnetic layer 12 has the reverse orientation of the magnetic field emitted from the magnetic pole 30. The magnetization 11M of the first magnetic layer 11 does not reverse.

In the embodiment, the electrical resistance between the magnetic pole 30 and the first shield 31 may change according to the orientation of the magnetization 11M of the first magnetic layer 11. For example, the electrical resistance between the magnetic pole 30 and the first shield 31 when the first current I1 is caused to flow between the magnetic pole 30 and the first shield 31 is taken as a first electrical resistance. The electrical resistance between the magnetic pole 30 and the first shield 31 when the second current I2 is caused to flow between the magnetic pole 30 and the first shield 31 is taken as a second electrical resistance. The first electrical resistance is different from the second electrical resistance. The orientation of the second current I2 is the reverse of the orientation of the first current I1.

For example, the electrical resistance between the magnetic pole 30 and the second shield 32 when the second current I2 is caused to flow between the magnetic pole 30 and the second shield 32 is taken as a third electrical resistance. The electrical resistance between the magnetic pole 30 and the second shield 32 when the first current I1 is caused to flow between the magnetic pole 30 and the second shield 32 is taken as a fourth electrical resistance. The third electrical resistance is different from the fourth electrical resistance. In such a case as well, the orientation of the second current I2 is the reverse of the orientation of the first current I1.

Figure 4:
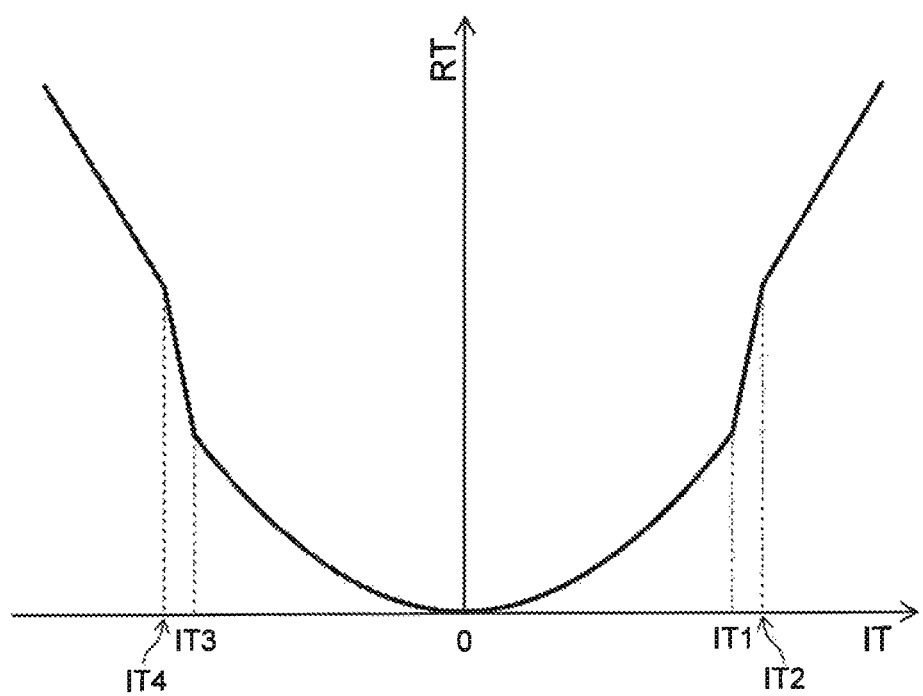
FIG. 4 is a graph illustrating a characteristic of the magnetic head.

FIG. 4 is a graph illustrating a characteristic of the magnetic head.

FIG. 4 illustrates the change of the electrical resistance of the magnetic head 110. The horizontal axis is a current IT flowing between the first terminal T1 and the second terminal T2. The vertical axis is an electrical resistance RT between the first terminal T1 and the second terminal T2.

As shown in FIG. 4, the electrical resistance RT between the first terminal T1 and the second terminal T2 increases nonlinearly as the absolute value of the current. IT flowing between the first terminal T1 and the second terminal T2 increases. The electrical resistance (which may be the electrical resistance RT) between the first shield 31 and the second shield 32 increases nonlinearly when the first current from the first shield 31 toward the second shield 32 is caused to flow in the first stacked body SB1 and the second stacked body SB2 and the magnitude of the first current is increased. The electrical resistance (which may be the electrical resistance RT) increases nonlinearly when the second current from the second shield 32 toward the first shield 31 is caused to flow in the first stacked body SB1 and the second stacked body SB2 and the magnitude of the second current is increased.

For example, the electrical resistance RT increases curvilinearly when the absolute value of the current IT is small (when the current IT is between 0 and the value IT1 or between 0 and the value IT3). It is considered that this is caused by the temperature increase due to the current IT.

As the absolute value of the current IT increases further, the electrical resistance RT increases steeply (when the current IT is between the value IT1 and the value IT2 or between the value IT3 and the value IT4). It is considered that this is due to one of the magnetization 11M of the first magnetic layer 11 or the magnetization 12M of the second magnetic layer 12 reversing. For example, one of the magnetization 11M or the magnetization 12M reverses when the current IT is positive. For example, the other of the magnetization 11M or the magnetization 12M reverses when the current IT is negative.

The magnetic layer for which the magnetization reverses is determined by the materials of the conductive layers included in the stacked bodies and the orientation of the current.

In FIG. 4, the electrical resistance RT is substantially symmetric with respect to positive and negative of the current IT. In the embodiment, the electrical resistance RT may be asymmetric. For example, the symmetry is dependent on the materials, etc.

For example, the electrical resistance difference recited above is based on a magnetoresistance effect.

The spin diffusion length is small for at least one material selected from the group consisting of Ta, Pt, W, Ru, Mo, Ir, Rh, and Pd. By using such a material, the magnetization reversal efficiency (e.g., the magnetization reversal rate) of the magnetic layer (the first magnetic layer 11 or the second magnetic layer 12) can be increased.

For example, it is considered that the spin-transfer torque acting on the magnetic layer at the interface between the magnetic layer and the conductive layer can be suppressed when the conductive layer includes Ta.

Figure 5A:
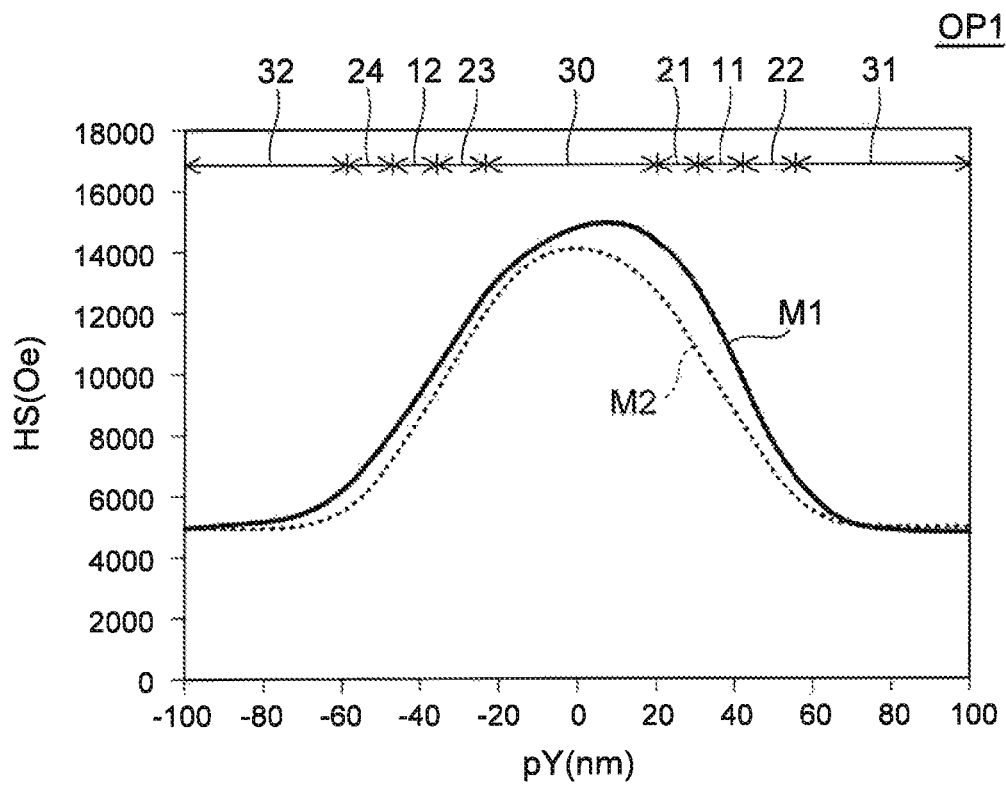
FIG. 5A and FIG. 5B are graphs illustrating characteristics of the magnetic head.
Figure 5B:
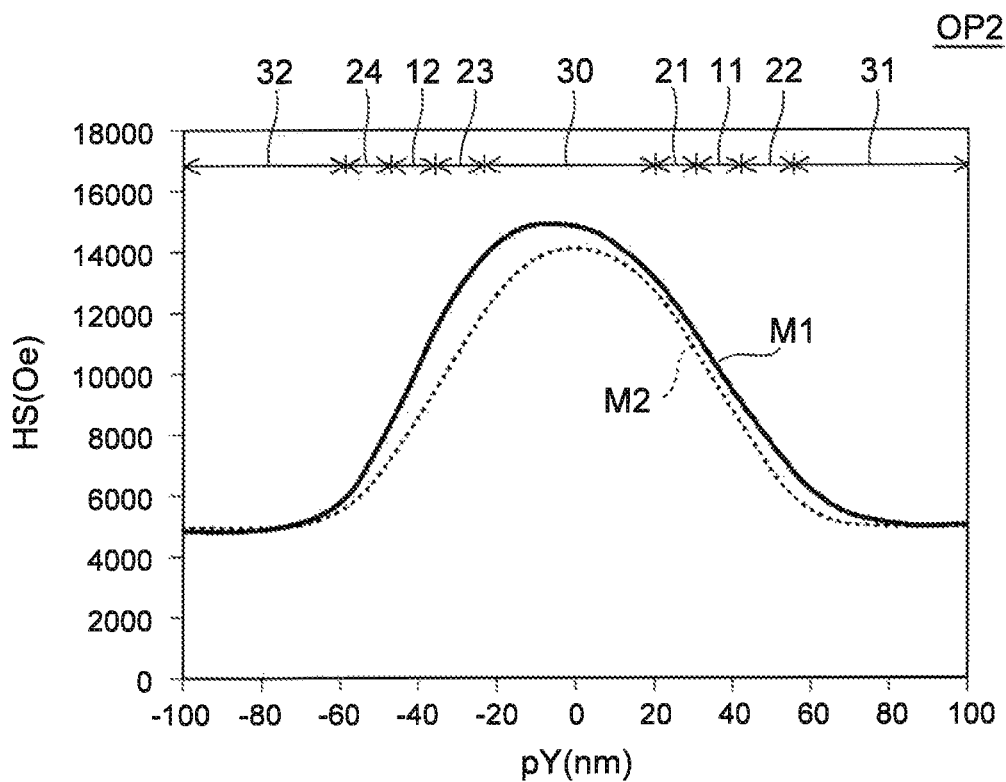

FIG. 5A and FIG. 5B are graphs illustrating characteristics of the magnetic head.

These figures show simulation results of the off-track profile of the magnetic head magnetic field. The horizontal axis is a position pY (nm) in the Y-axis direction. In these figures, the vertical axis is a magnetic field strength HS (Oe) applied from the magnetic pole 30 to the magnetic recording medium 80. The characteristics of a first model M1 and a second model M2 of the simulation models are shown in these figures. The first model M1 has the configuration of the magnetic head 110 recited above; and the first operation OP1 (the supply of the first current I1) or the second operation OP2 (the supply of the second current I2) is performed. On the other hand, the first stacked body SB1 and the second stacked body SB2 are not provided in the second model M2.

FIG. 5A illustrates the characteristic of the first operation OP1 of the first model M1. FIG. 5B illustrates the characteristic of the second operation OP2 of the first model M1. The characteristic of the second model M2 is illustrated in both of these figures.

As shown in FIG. 5A and FIG. 5B, a characteristic that is laterally symmetric with respect to the position pY of 0 nm is obtained for the second model M2. For the first operation OP1 of the first model M1 as shown in FIG. 5A, the change of the recording magnetic field HS in the region where the position pY is positive is steeper than the change of the recording magnetic field HS in the region where the position pY is negative. This corresponds to the recording magnetic field HS changing steeply at one end portion in the cross-track direction (the end portion on the first shield 31 side).

For the second operation OP2 of the first model M1 as shown in FIG. 5B, the change of the recording magnetic field HS in the region where the position pY is negative is steeper than the change of the recording magnetic field HS in the region where the position pY is positive. This corresponds to the recording magnetic field HS changing steeply at the other end portion in the cross-track direction (the end portion on the second shield 32 side).

Thus, the distribution of the magnetic field in the cross-track direction can be asymmetric. For example, the shingle recording can be performed better. For example, good recording and reproducing characteristics are obtained even when the spacing in the cross-track direction of multiple tracks is reduced. According to the embodiment, the recording density can be increased.

An example of operations of the magnetic head 110 according to the embodiment will now be described. The first stacked body SB1 will be described. The description recited below is applicable to the second stacked body SB2 by replacing the first stacked body SB1 with the second stacked body SB2 and by replacing the first shield 31 with the second shield 32.

Figure 6:
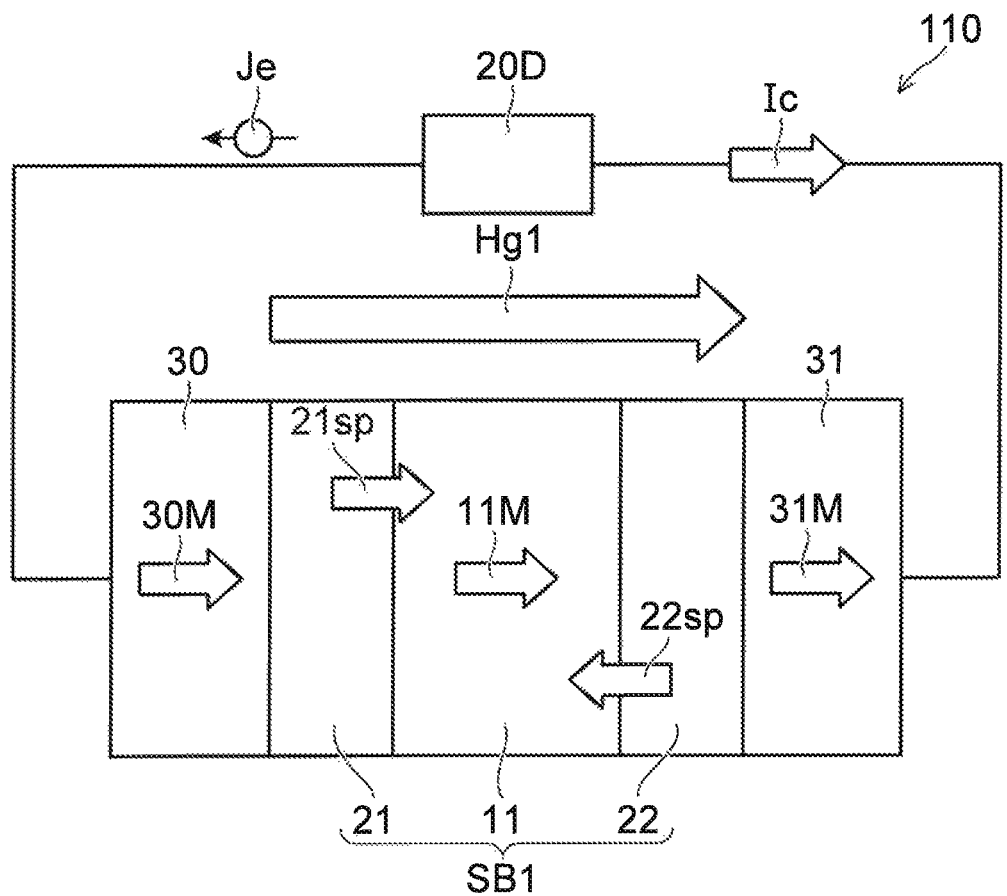
FIG. 6 is a schematic view illustrating the operations of the magnetic head according to the embodiment.

FIG. 6 is a schematic view illustrating the operations of the magnetic head according to the embodiment.

As shown in FIG. 6, the first stacked body SB1 is provided between the magnetic pole 30 and the first shield 31. The first magnetic layer 11, the first conductive layer 21, and the second conductive layer 22 are provided in the first stacked body SB1.

The recording current is supplied to the coil 30c of the magnetic pole 30 from the second electrical circuit 30D (referring to FIG. 1A). Thereby, a gap magnetic field Hg1 is generated from the magnetic pole 30. The gap magnetic field Hg1 is applied to the first stacked body SB1.

For example, a magnetization 30M of the magnetic pole 30 and a magnetization 31M of the first shield 31 are substantially parallel to the gap magnetic field Hg1. The magnetization 11M of the first magnetic layer 11 is substantially parallel to the gap magnetic field Hg1.

At this time, a current Ic (corresponding to the first current I1) is supplied from the first electrical circuit 20D to the first stacked body SB1. In the example, the current Ic is supplied to the first stacked body SB1 via the first shield 31 and the magnetic pole 30. For example, the current Ic flows from the second conductive layer 22 toward the first conductive layer 21. At this time, an electron current Je flows. The electron current Je flows from the first conductive layer 21 toward the second conductive layer 22.

A spin torque 21sp is generated at the interface between the first conductive layer 21 and the first magnetic layer 11 by the electron current Je. The spin torque 21sp is transmissive. On the other hand, a spin torque 22sp is generated at the interface between the first magnetic layer 11 and the second conductive layer 22 by the electron current Je. The spin torque 22sp is reflective. The magnetization 11M of the first magnetic layer 11 reverses due to these spin torques. The reversed magnetization 11M has a component having the reverse orientation of the gap magnetic field Hg1.

For example, the current Ic may flow from the first conductive layer 21 toward the second conductive layer 22. At this time, the orientation of the spin torque 21sp and the orientation of the spin torque 22sp shown in FIG. 6 reverse. The spin torque 21sp is reflective; and the spin torque 22sp is transmissive.

In the embodiment, the first operation OP1 or the second operation OP2 recited above is performed. An example of these operations will now be described.

Figure 7:
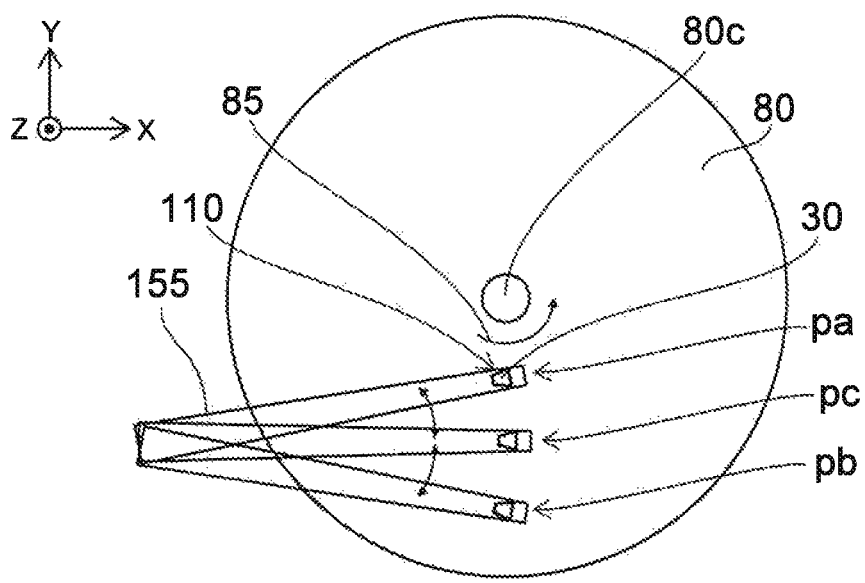
FIG. 7 is a schematic view illustrating a magnetic recording and reproducing device according to the embodiment.

FIG. 7 is a schematic view illustrating a magnetic recording and reproducing device according to the embodiment.

As shown in FIG. 7, the planar configuration of the magnetic recording medium 80 is, for example, substantially circular. On the other hand, an arm 155 that has a movable tip portion is provided. The magnetic pole 30 (the magnetic head 110) is provided at the tip portion of the arm 155. The magnetic pole 30 moves relative to the magnetic recording medium 80 by the arm 155 rotating with a prescribed fulcrum as an axis.

For example, the magnetic recording medium 80 has a disk configuration having a center 80c. The magnetic recording medium 80 includes an inner circumferential region pa, an outer circumferential region pb, and a middle region pc. The inner circumferential region pa is provided between the outer circumferential region pb and the center 80c. The middle region pc is provided between the outer circumferential region pb and the inner circumferential region pa. The magnetic recording medium 80 rotates with the center 80c as an axis. A medium movement direction 85 corresponds to the circumferential direction.

For example, one of the inner circumferential region pa or the outer circumferential region pb is taken as a first region. The other of the inner circumferential region pa or the outer circumferential region pb is taken as a second region.

For example, the first electrical circuit 20D supplies a current (the first current I1) having the orientation from the first terminal T1 toward the second terminal T2 (referring to FIG. 1B) when the magnetic head 110 (the magnetic pole 30) opposes the first region of the magnetic recording medium 80.

For example, the first electrical circuit 20D supplies a current (the second current I2) having the orientation from the second terminal T2 toward the first terminal T1 when the magnetic head 110 (the magnetic pole 30) opposes the second region of the magnetic recording medium 80.

The magnetic recording medium 80 rotates with a portion (the center 80c) of the magnetic recording medium 80 as the center. The first region recited above is one of the inner circumferential region pa or the outer circumferential region pb in the rotation recited above. The second region is the other of the inner circumferential region pa or the outer circumferential region pb in the rotation recited above.

For example, the magnetic head 110 performs shingle recording to the magnetic recording medium 80. In the embodiment, good shingle recording can be performed. A magnetic head and a magnetic recording and reproducing device can be provided in which the recording density can be increased.

Second Embodiment

A second embodiment relates to a magnetic recording and reproducing device. The magnetic recording and reproducing device includes, for example, the magnetic head 110 described in reference to the first embodiment (and the magnetic heads of the modifications of the magnetic head 110). The magnetic recording and reproducing device further includes the magnetic recording medium 80, and the first electrical circuit 20D that is configured to supply a current to the first stacked body SB1 and the second stacked body SB2.

An example of the magnetic recording and reproducing device according to the embodiment will now be described.

Figure 8:
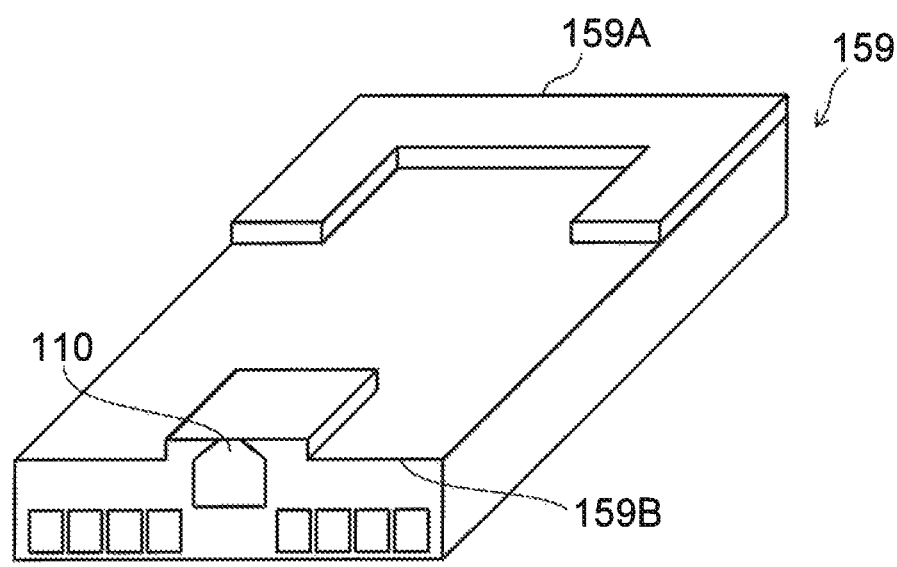
FIG. 8 is a schematic perspective view illustrating a portion of the magnetic recording and reproducing device according to the embodiment.

FIG. 8 is a schematic perspective view illustrating a portion of the magnetic recording and reproducing device according to the embodiment.

FIG. 8 illustrates a head slider.

The magnetic head 110 is provided in the head slider 159. The head slider 159 includes, for example, $Al_2O_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is disposed at the side surface of the air outflow side 159B of the head slider 159 or the like. Thereby, the magnetic head 110 moves relative to the magnetic recording medium while flying over or contacting the magnetic recording medium.

Figure 9:
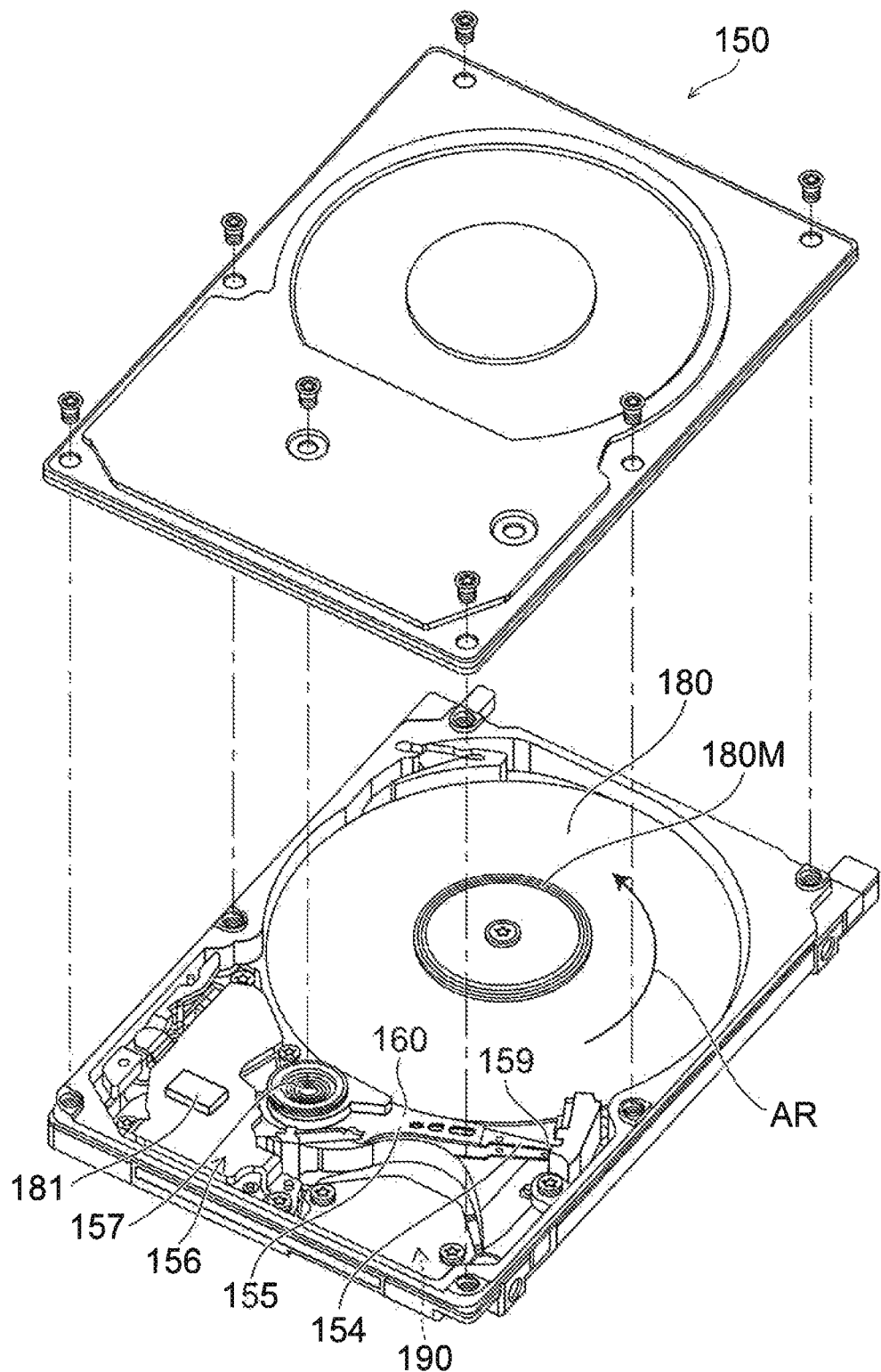
FIG. 9 is a schematic perspective view illustrating the magnetic recording and reproducing device according to the embodiment.

FIG. 9 is a schematic perspective view illustrating the magnetic recording and reproducing device according to the embodiment.

Figure 10A:
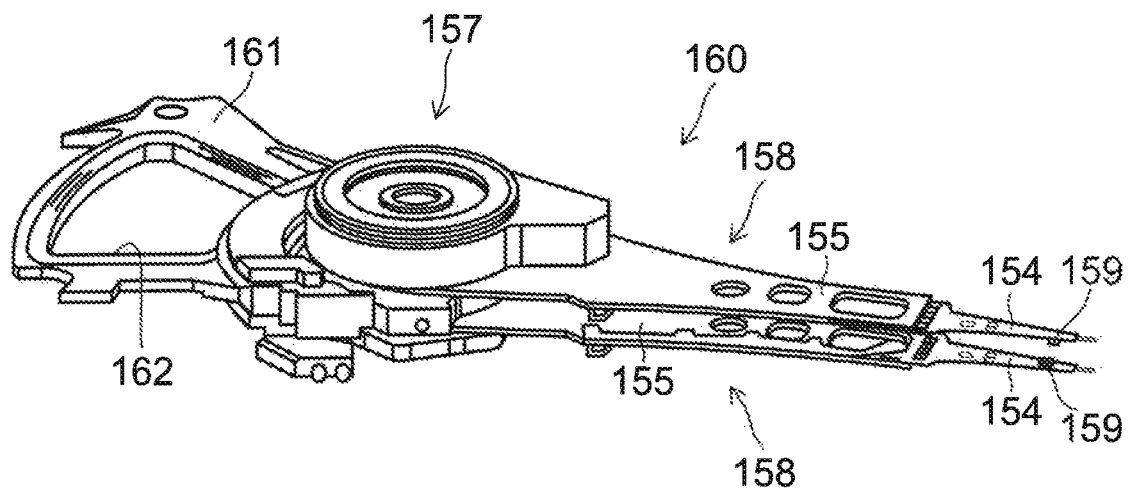
FIG. 10A and FIG. 10B are schematic perspective views illustrating a portion of the magnetic recording and reproducing device according to the embodiment.
Figure 10B:
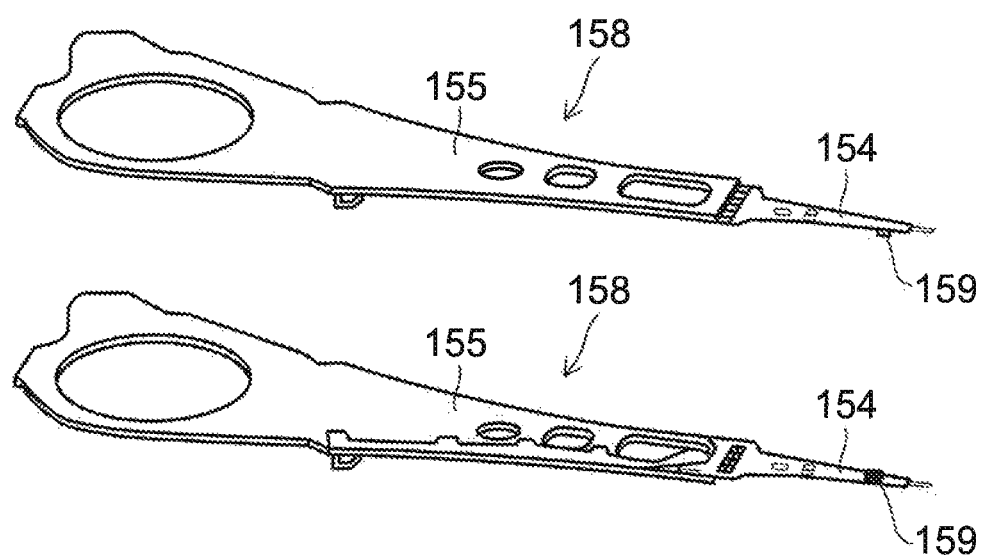

FIG. 10A and FIG. 10B are schematic perspective views illustrating a portion of the magnetic recording and reproducing device according to the embodiment.

As shown in FIG. 9, a rotary actuator is used in the magnetic recording and reproducing device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording and reproducing device 150 according to the embodiment may include multiple recording medium disks 180. The magnetic recording and reproducing device 150 may include a recording medium 181. The recording medium 181 is, for example, a SSD (Solid State Drive). The recording medium 181 includes, for example, nonvolatile memory such as flash memory, etc. For example, the magnetic recording and reproducing device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-opposing surface (the ABS) of the head slider 159 are balanced. The distance between the medium-opposing surface of the head slider 159 and the surface of the recording medium disk 180 becomes a prescribed fly height. In the embodiment, the head slider 159 may contact the recording medium disk 180. For example, contact-sliding is applicable. The suspension 154 is connected to one end of the arm 155 (e.g., the actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, the drive coil and a magnetic circuit. The drive coil is wound onto the bobbin part of the arm 155. The magnetic circuit includes a permanent magnet and an opposing yoke. The drive coil is provided between the permanent magnet and the opposing yoke. The suspension 154 has one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

FIG. 10A illustrates the configuration of a portion of the magnetic recording and reproducing device and is an enlarged perspective view of a head stack assembly 160.

FIG. 10B is a perspective view illustrating a magnetic head assembly (a head gimbal assembly (HGA)) 158 that is a portion of the head stack assembly 160.

As shown in FIG. 10A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 10B, the head gimbal assembly 158 includes the arm 155 extending from the bearing part 157 and the suspension 154 extending from the arm 155.

The head slider 159 is provided at the tip of the suspension 154. The magnetic head according to the embodiment is provided at the head slider 159.

The magnetic head assembly (the head gimbal assembly) 158 according to the embodiment includes the magnetic head according to the embodiment, the head slider 159 on which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. The suspension 154 may include, for example, lead wires (not illustrated) for a spin torque oscillator, etc. These lead wires are electrically connected to multiple electrodes provided in the magnetic head.

A signal processor 190 is provided in the magnetic recording and reproducing device 150. The signal processor 190 records and reproduces the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording and reproducing device 150 according to the embodiment includes a magnetic recording medium, the magnetic head according to the embodiment, a movable part, a position controller, and a signal processor. The movable part causes the magnetic recording medium and the magnetic head to separate or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium recited above. The movable part recited above includes, for example, the head slider 159. The position controller recited above includes, for example, the head gimbal assembly 158.

The magnetic recording and reproducing device 150 according to the embodiment includes a magnetic recording medium, the magnetic head assembly according to the embodiment, and a signal processor that records and reproduces the signals to and from the magnetic recording medium by using a magnetic head provided in the magnetic head assembly. The embodiments include, for example, the following configurations (e.g., technological proposals).

Configuration 1

A magnetic head, comprising:
a magnetic pole;
a first shield;
a second shield, at least a portion of the magnetic pole being provided between the first shield and the second shield;
a first stacked body provided between the magnetic pole and the first shield; and
a second stacked body provided between the magnetic pole and the second shield,
the first stacked body including
a first magnetic layer including at least one selected from the group consisting of Fe, Co, and Ni,
a first conductive layer provided between the magnetic pole and the first magnetic layer, and
a second conductive layer provided between the first magnetic layer and the first shield,
the second stacked body including
a second magnetic layer including at least one selected from the group consisting of Fe, Co, and Ni,
a third conductive layer provided between the magnetic pole and the second magnetic layer, and
a fourth conductive layer provided between the second magnetic layer and the second shield.

Configuration 2

The magnetic head according to Configuration 1, further comprising:
a first terminal electrically connected to the first shield; and
a second terminal electrically connected to the second shield.

Configuration 3

The magnetic head according to Configuration 1 or 2, wherein
a material of the first conductive layer is different from a material of the second conductive layer, and
a material of the third conductive layer is different from a material of the fourth conductive layer.

Configuration 4

The magnetic head according to any one of Configurations 1 to 3, wherein the first to fourth conductive layers are nonmagnetic.

Configuration 5

The magnetic head according to Configuration 1 or 2, wherein
the first conductive layer includes at least one selected from the group consisting of Ta, Pt, W, Ru, Mo, Ir, Rh, and Pd,
the second conductive layer includes at least one selected from the group consisting of Cu, Ag, Al, and Au,
the third conductive layer includes at least one selected from the group consisting of Ta, Pt, W, Ru, Mo, Ir, Rh, and Pd, and
the fourth conductive layer includes at least one selected from the group consisting of Cu, Ag, Al, and Au.

Configuration 6

The magnetic head according to Configuration 1 or 2, wherein
the first conductive layer includes at least one selected from the group consisting of Cu, Ag, Al, and Au,
the second conductive layer includes at least one selected from the group consisting of Ta, Pt, W, Ru, Mo, Ir, Rh, and Pd, the third conductive layer includes at least one selected from the group consisting of Cu, Ag, Al, and Au, and the fourth conductive layer includes at least one selected from the group consisting of Ta, Pt, W, Ru, Mo, Ir, Rh, and Pd.

Configuration 7

The magnetic head according to any one of Configurations 1 to 6, wherein a current is conductible from the second conductive layer toward the first conductive layer and from the third conductive layer toward the fourth conductive layer.

Configuration 8

The magnetic head according to any one of Configurations 1 to 6, wherein a current is conductible from the fourth conductive layer toward the third conductive layer and from the second conductive layer toward the first conductive layer.

Configuration 9

The magnetic head according to any one of Configurations 1 to 6, wherein
a first electrical resistance between the magnetic pole and the first shield when a first current is caused to flow between the magnetic pole and the first shield is different from a second electrical resistance between the magnetic pole and the first shield when a second current is caused to flow between the magnetic pole and the first shield, and
an orientation of the second current is the reverse of an orientation of the first current.

Configuration 10

The magnetic head according to any one of Configurations 1 to 6, wherein
a third electrical resistance between the magnetic pole and the second shield when a second current is caused to flow between the magnetic pole and the second shield is different from a fourth electrical resistance between the magnetic pole and the second shield when a first current is caused to flow between the magnetic pole and the second shield, and
an orientation of the second current is the reverse of an orientation of the first current.

Configuration 11

The magnetic head according to any one of Configurations 1 to 6, wherein
an electrical resistance between the first shield and the second shield increases nonlinearly when a first current is caused to flow in the first stacked body and the second stacked body from the first shield toward the second shield and when a magnitude of the first current is increased,
the electrical resistance increases nonlinearly when a second current is caused to flow in the first stacked body and the second stacked body from the second shield toward the first shield and when a magnitude of the second current is increased.

Configuration 12

The magnetic head according to any one of Configurations 1 to 11, wherein the first conductive layer contacts the magnetic pole and the first magnetic layer, the second conductive layer contacts the first magnetic layer and the first shield, the third conductive layer contacts the magnetic pole and the second magnetic layer, and the fourth conductive layer contacts the second magnetic layer and the second shield.

Configuration 13

The magnetic head according to any one of Configurations 1 to 12, wherein a thickness of the first magnetic layer along a direction from the magnetic pole toward the first shield is not less than 4 nm and not more than 20 nm.

Configuration 14

The magnetic head according to any one of Configurations 1 to 12, wherein a thickness of the first conductive layer along a direction from the magnetic pole toward the first shield and a thickness of the second conductive layer along the direction from the magnetic pole toward the first shield each are not less than 0.3 nm and not more than 15 nm.

Configuration 15

The magnetic head according to any one of Configurations 1 to 12, wherein a thickness of the second magnetic layer along a direction from the magnetic pole toward the second shield is not less than 4 nm and not more than 20 nm.

Configuration 16

The magnetic head according to any one of Configurations 1 to 12, wherein a thickness of the third conductive layer along a direction from the magnetic pole toward the second shield and a thickness of the fourth conductive layer along the direction from the magnetic pole toward the second shield each are not less than 0.3 nm and not more than 15 nm.

Configuration 17

The magnetic head according to any one of Configurations 1 to 16, further comprising a third shield,
a direction from the magnetic pole toward the third shield crossing a direction from the first shield toward the second shield.

Configuration 18

A magnetic recording and reproducing device, comprising:
the magnetic head according to any one of Configurations 1 to 17;
a magnetic recording medium, information being recorded in the magnetic recording medium by the magnetic head; and
a first electrical circuit configured to supply a current to the first stacked body.

Configuration 19

A magnetic recording and reproducing device, comprising:

the magnetic head according to Configuration 2;

a magnetic recording medium, information being recorded in the magnetic recording medium by the magnetic head; and a first electrical circuit, the first electrical circuit supplying a current having an orientation from the first terminal toward the second terminal when the magnetic head opposes a first region of the magnetic recording medium, the first electrical circuit supplying a current having an orientation from the second terminal toward the first terminal when the magnetic head opposes a second region of the magnetic recording medium.

Configuration 20

The magnetic recording and reproducing device according to Configuration 19, wherein the magnetic recording medium rotates with a portion of the magnetic recording medium as a center, the first region is one of an inner circumferential region or an outer circumferential region in the rotation, and the second region is the other of the inner circumferential region or the outer circumferential region in the rotation.

Configuration 21

The magnetic recording and reproducing device according to any one of Configurations 18 to 20, wherein the magnetic head performs at least shingle recording to the magnetic recording medium.

According to the embodiments, a magnetic head and a magnetic recording and reproducing device can be provided in which the recording density can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, shield regions, stacked bodies, magnetic layers, conductive layers, interconnects, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording and reproducing devices practicable by an appropriate design modification by one skilled in the art based on the magnetic heads, and the magnetic recording and reproducing devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
  a magnetic pole;
  a first shield;
  a second shield, at least a portion of the magnetic pole being provided between the first shield and the second shield;
  a first stacked body provided between the magnetic pole and the first shield; and
  a second stacked body provided between the magnetic pole and the second shield,
  the first stacked body including
    a first magnetic layer including at least one selected from the group consisting of Fe, Co, and Ni,
    a first conductive layer provided between the magnetic pole and the first magnetic layer, and
    a second conductive layer provided between the first magnetic layer and the first shield,
  the second stacked body including
    a second magnetic layer including at least one selected from the group consisting of Fe, Co, and Ni,
    a third conductive layer provided between the magnetic pole and the second magnetic layer, and
    a fourth conductive layer provided between the second magnetic layer and the second shield,
  wherein a current is conductible from the second conductive layer toward the first conductive layer and from the third conductive layer toward the fourth conductive layer.

2. The head according to claim 1, further comprising:
  a first terminal electrically connected to the first shield; and
  a second terminal electrically connected to the second shield.

3. The head according to claim 1, wherein
  a material of the first conductive layer is different from a material of the second conductive layer, and
  a material of the third conductive layer is different from a material of the fourth conductive layer.

4. The head according to claim 1, wherein the first to fourth conductive layers are nonmagnetic.

5. The head according to claim 1, wherein
  the first conductive layer includes at least one selected from the group consisting of Ta, Pt, W, Ru, Mo, Ir, Rh, and Pd,
  the second conductive layer includes at least one selected from the group consisting of Cu, Ag, Al, and Au,
  the third conductive layer includes at least one selected from the group consisting of Ta, Pt, W, Ru, Mo, Ir, Rh, and Pd, and
  the fourth conductive layer includes at least one selected from the group consisting of Cu, Ag, Al, and Au.

6. The head according to claim 1, wherein
  the first conductive layer includes at least one selected from the group consisting of Cu, Ag, Al, and Au, the second conductive layer includes at least one selected from the group consisting of Ta, Pt, W, Ru, Mo, Ir, Rh, and Pd, the third conductive layer includes at least one selected from the group consisting of Cu, Ag, Al, and Au, and the fourth conductive layer includes at least one selected from the group consisting of Ta, Pt, W, Ru, Mo, Ir, Rh, and Pd.

7. The head according to claim 1, wherein a first electrical resistance between the magnetic pole and the first shield when a first current is caused to flow between the magnetic pole and the first shield is different from a second electrical resistance between the magnetic pole and the first shield when a second current is caused to flow between the magnetic pole and the first shield, and an orientation of the second current is the reverse of an orientation of the first current.

8. The head according to claim 1, wherein a third electrical resistance between the magnetic pole and the second shield when a second current is caused to flow between the magnetic pole and the second shield is different from a fourth electrical resistance between the magnetic pole and the second shield when a first current is caused to flow between the magnetic pole and the second shield, and an orientation of the second current is the reverse of an orientation of the first current.

9. The head according to claim 1, wherein an electrical resistance between the first shield and the second shield increases nonlinearly when a first current is caused to flow in the first stacked body and the second stacked body from the first shield toward the second shield and when a magnitude of the first current is increased, the electrical resistance increases nonlinearly when a second current is caused to flow in the first stacked body and the second stacked body from the second shield toward the first shield and when a magnitude of the second current is increased.

10. The head according to claim 1, wherein the first conductive layer contacts the magnetic pole and the first magnetic layer, the second conductive layer contacts the first magnetic layer and the first shield, the third conductive layer contacts the magnetic pole and the second magnetic layer, and the fourth conductive layer contacts the second magnetic layer and the second shield.

11. The head according to claim 1, wherein a thickness of the first magnetic layer along a direction from the magnetic pole toward the first shield is not less than 4 nm and not more than 20 nm.

12. The head according to claim 1, wherein a thickness of the first conductive layer along a direction from the magnetic pole toward the first shield and a thickness of the second conductive layer along the direction from the magnetic pole toward the first shield each are not less than 0.3 nm and not more than 15 nm.

13. The head according to claim 1, wherein a thickness of the second magnetic layer along a direction from the magnetic pole toward the second shield is not less than 4 nm and not more than 20 nm.

14. The head according to claim 1, wherein a thickness of the third conductive layer along a direction from the magnetic pole toward the second shield and a thickness of the fourth conductive layer along the direction from the magnetic pole toward the second shield each are not less than 0.3 nm and not more than 15 nm.

15. The head according to claim 1, further comprising a third shield, a direction from the magnetic pole toward the third shield crossing a direction from the first shield toward the second shield.

16. A magnetic recording and reproducing device, comprising:

the magnetic head according to claim 1;

a magnetic recording medium, information being recorded in the magnetic recording medium by the magnetic head; and a first electrical circuit configured to supply a current to the first stacked body.

17. A magnetic recording and reproducing device, comprising:

the magnetic head according to claim 2;

a magnetic recording medium, information being recorded in the magnetic recording medium by the magnetic head; and a first electrical circuit, the first electrical circuit supplying a current having an orientation from the first terminal toward the second terminal when the magnetic head opposes a first region of the magnetic recording medium, the first electrical circuit supplying a current having an orientation from the second terminal toward the first terminal when the magnetic head opposes a second region of the magnetic recording medium.

18. The device according to claim 17, wherein the magnetic recording medium rotates with a portion of the magnetic recording medium as a center, the first region is one of an inner circumferential region or an outer circumferential region in the rotation, and the second region is the other of the inner circumferential region or the outer circumferential region in the rotation.

19. A magnetic head, comprising:

a magnetic pole;

a first shield;

a second shield, at least a portion of the magnetic pole being provided between the first shield and the second shield;

a first stacked body provided between the magnetic pole and the first shield; and a second stacked body provided between the magnetic pole and the second shield, the first stacked body including a first magnetic layer including at least one selected from the group consisting of Fe, Co, and Ni, a first conductive layer provided between the magnetic pole and the first magnetic layer, and a second conductive layer provided between the first magnetic layer and the first shield, the second stacked body including a second magnetic layer including at least one selected from the group consisting of Fe, Co, and Ni, a third conductive layer provided between the magnetic pole and the second magnetic layer, and a fourth conductive layer provided between the second magnetic layer and the second shield, wherein a current is conductible from the fourth conductive layer toward the third conductive layer and from the first conductive layer toward the second conductive layer.

* * * * *